No. 845,421. PATENTED FEB. 26, 1907.
N. W. KLINE.
ICE CREAM DIPPER.
APPLICATION FILED MAY 1, 1906.
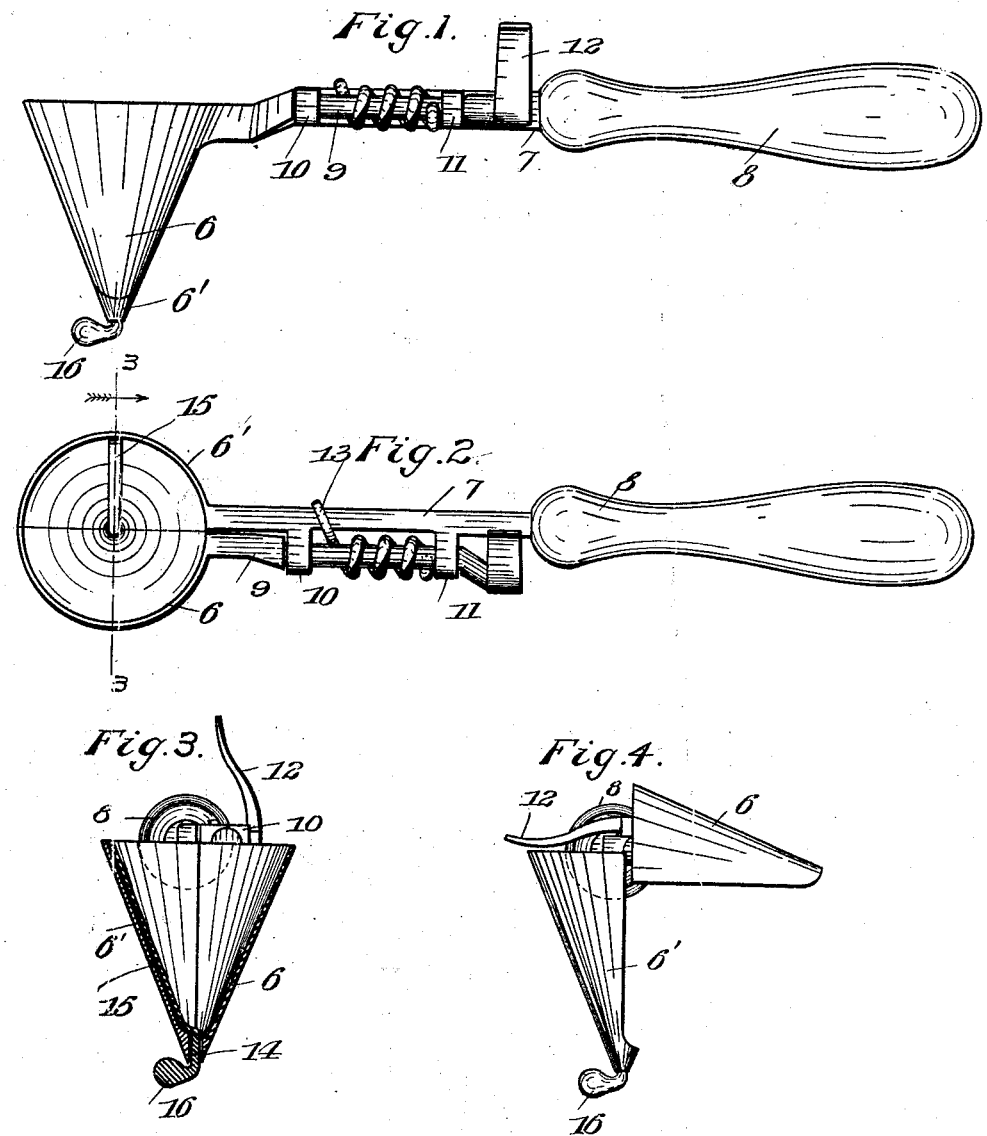

UNITED STATES PATENT OFFICE.

NICK W. KLINE, OF LONGBEACH, CALIFORNIA.

ICE-CREAM DIPPER.

No. 845,421.

Specification of Letters Patent.

Patented Feb. 26, 1907.

Application filed May 1, 1906. Serial No. 314,670.

*To all whom it may concern:*

Be it known that I, NICK W. KLINE, a citizen of the United States, residing at Longbeach, in the county of Los Angeles and State of California, have invented new and useful Improvements in Ice-Cream Dippers, of which the following is a specification.

My invention relates, primarily, to an ice-cream dipper for filling pastry-shells of a conical shape, commonly called "cornucopias;" and the object thereof is to provide a dipper which will form the ice-cream into a proper shape to be received into such shell and from which the cream can be quickly and easily ejected. I accomplish this object by the dipper described herein and illustrated in the accompanying drawings, in which—

Figure 1 is a side elevation of my improved dipper. Fig. 2 is a plan of the same. Fig. 3 is a section on the line 3 3 of Fig. 2. Fig. 4 is an end elevation showing the dipper open for discharging the cream therefrom.

In the drawings the bowl of the dipper is divided vertically and longitudinally into two almost equal parts or sections 6 and 6', which together form a hollow cone. Section 6' is provided with a shank 7, to which the handle 8 is secured. Section 6 is provided with a shank 9, which passes through lugs 10 and 11, secured to shank 7, and is revoluble in said lugs and terminates in an upwardly-projecting thumb-piece 12, by means of which shank 9 is rotated. A spring 13 is coiled around shank 9 between lugs 10 and 11 and has one end secured to shank 7 and the other end secured to shank 9, so that when the operator moves the thumb-piece to separate the sections of the dipper, as shown in Fig. 4, and removes pressure therefrom the spring will return the section to its closed position. Section 6 is a little shorter than section 6', and the lower end of section 6' projects below the end of section 6, and passing through this projecting end is the shank 14 of the scraper-blade 15, which blade is bent at an angle to the shank, so that when the shank is revolved the scraper-blade will scrape along the inside of the dipper and cut loose therefrom any cream that may have a tendency to adhere thereto. The outer end of the shank is provided with a finger-piece 16, by means of which the scraper can be rotated.

The bowl of the dipper may be of a different shape than that shown in the drawings, if desired, and preferably is of a size to contain enough cream to fill a cornucopia.

The operator first fills the dipper and then rotates the scraper so as to pass it entirely around the inside of the bowl and leave it resting against section 6', preferably as shown in Fig. 3. He then with the thumb of the hand which grasps the handle presses upon the thumb-piece 12 and brings it over upon shank 7, which causes section 6 to open to the position shown in Fig. 4, whereupon the cream drops out into the cornucopia held in the other hand or in a suitable receptacle.

Having described my invention, what I claim is new, and desire to secure by Letters Patent, is—

1. A dipper having a bowl composed of two sections one section being provided with a handle, the other section being hinged to said handle; yielding means to hold the sections of the bowl normally in engagement; and means for enabling the operator to cause the separation of those portions of the bowl not held in engagement by the hinge.

2. A dipper having a conical-shaped bowl longitudinally and vertically divided into two sections, one section being provided with a shank having a handle and the other section having a shank provided with a thumb-piece; a hinged connection between said shanks; a spring having its ends connected to said shanks; and a scraper within said bowl.

In witness that I claim the foregoing I have hereunto subscribed my name this 25th day of April, 1906.

NICK W. KLINE.

Witnesses:
A. C. HOOVER,
GEO. A. MILLER.